(12) United States Patent
Mitchell

(10) Patent No.: US 9,743,580 B2
(45) Date of Patent: Aug. 29, 2017

(54) LAWNMOWER BLADE HOLDER DEVICE

(71) Applicant: John Mitchell, Minden, LA (US)

(72) Inventor: John Mitchell, Minden, LA (US)

( * ) Notice: Subject to any disclaimer, the term of this patent is extended or adjusted under 35 U.S.C. 154(b) by 0 days.

(21) Appl. No.: 14/795,168

(22) Filed: Jul. 9, 2015

(65) Prior Publication Data

US 2016/0050846 A1    Feb. 25, 2016

Related U.S. Application Data

(60) Provisional application No. 62/038,908, filed on Aug. 19, 2014.

(51) Int. Cl.
  *B25B 1/20*    (2006.01)
  *A01D 34/00*   (2006.01)
  *A01D 34/82*   (2006.01)

(52) U.S. Cl.
  CPC ......... *A01D 34/001* (2013.01); *A01D 34/828* (2013.01)

(58) Field of Classification Search
  USPC ...................................... 269/37, 40, 47, 280
  See application file for complete search history.

(56) References Cited

U.S. PATENT DOCUMENTS

| | | | | |
|---|---|---|---|---|
| 1,460,011 A | * | 6/1923 | Banowetz | B25B 11/00 269/280 |
| 3,009,497 A | * | 11/1961 | Lorch | B23D 49/12 30/514 |
| 3,134,280 A | | 5/1964 | Guderjan et al. | |
| 3,752,062 A | * | 8/1973 | Morgan, Sr. | F16D 69/0416 100/208 |
| 4,179,808 A | * | 12/1979 | Smith | G01B 3/56 30/293 |
| 4,564,991 A | * | 1/1986 | Taylor | A01D 34/001 254/131 |
| 4,736,544 A | * | 4/1988 | Greenquist | B24B 3/365 451/124 |
| 4,882,960 A | | 11/1989 | Kugler | |
| 5,018,347 A | | 5/1991 | Feilen | |
| 7,775,026 B2 | | 8/2010 | Bever | |
| 7,784,254 B2 | | 8/2010 | Bever | |
| 8,302,274 B1 | * | 11/2012 | Depaz | A01D 34/001 269/229 |
| 2003/0182918 A1 | | 10/2003 | Stone et al. | |

\* cited by examiner

*Primary Examiner* — Joseph J Hail
*Assistant Examiner* — Shantese McDonald
(74) *Attorney, Agent, or Firm* — Global Intellectual Property Agency, LLC

(57) ABSTRACT

A blade holder device for supporting and immobilizing blades when replacing or assembling a pair of blades on a lawnmower. The blade holder device includes an X-shaped frame having a first elongated support pivotally secured to a second elongated support. The elongated supports have an aperture disposed in the center thereof in order to receive a fastener therethrough. Each elongated support further includes a first and second pair of segments permanently attached to the ends thereof. The pair of segments include a recessed area therebetween in order to receive a portion of a blade therein. The device is removably attached directly to the underside of the deck of a riding lawnmower. The device can be placed over a pair of blades to prevent injury of an individual removing or assembling the blades and to prevent damage to the blades themselves.

6 Claims, 3 Drawing Sheets

LAWNMOWER BLADE HOLDER DEVICE

CROSS REFERENCE TO RELATED APPLICATION

This application claims the benefit of U.S. Provisional Application No. 62/038,908 filed on Aug. 19, 2014. The above identified patent application is herein incorporated by reference in its entirety to provide continuity of disclosure.

BACKGROUND OF THE INVENTION

Field of the Invention

The present invention relates to lawnmower blade holder devices. More specifically, the present invention provides an X-shaped frame having a first elongated support pivotally secured to a second elongated support. The elongated supports each include an aperture disposed in the center thereof adapted to receive a fastener therethrough. Each elongated support further includes a first and second pair of segments permanently attached to the ends thereof, wherein each pair of segments include a recessed area therebetween adapted to receive a portion of a blade therein.

Assembling, removing, or replacing lawnmower blades can be a laborious task. Individuals generally have to reach their hands underneath the deck of their riding lawnmower for extended periods of time in order to remove or attach blades. This can lead to individuals receiving bruised knuckles, cuts, and other injuries to their hands. It can be increasingly frustrating to frequently repeat this process to change lawnmower blades. An efficient and easy means for changing lawnmower blades is needed.

Devices have been disclosed in the prior art that relate to lawnmower blade holder devices. These include devices that have been patented and published in patent application publications. These devices generally relate to lawnmower blade locks that prevents the blade of the lawnmower from rotating. These devices include U.S. Pat. No. 7,775,026 to Bever and U.S. Pat. No. 7,784,254 to Bever. Other devices, such as U.S. Pat. No. 5,018,347 to Feilen and U.S. Published Patent Application Number 2003/0182918, generally relate to a lawnmower blade having replaceable cutting edge members. Other devices, such as U.S. Pat. No. 3,134,280 to Guderjan et al. and U.S. Pat. No. 4,882,960 to Kugler, generally relate to hand tools that engage the lawnmower blade to prevent the blade from rotating. These devices, however, fail to disclose a lawnmower blade holder device having an X-shaped configuration that includes a holder for a pair of blades to fit therein, wherein the X-shaped configuration is adjustable adapted to receive a pair of blades of various distances apart.

In light of the devices disclosed in the prior art, it is submitted that the present invention substantially diverges in design elements from the prior art and consequently it is clear that there is a need in the art for an improvement to existing lawnmower blade holder devices. In this regard the instant invention substantially fulfills these needs.

SUMMARY OF THE INVENTION

In view of the foregoing disadvantages inherent in the known types of lawnmower blade holder devices now present in the prior art, the present invention provides a new lawnmower blade holder device wherein the same can be utilized for providing convenience for the user when replacing or assembling blades on a lawnmower.

It is therefore an object of the present invention to provide a new and improved lawnmower blade holder device that has all of the advantages of the prior art and none of the disadvantages.

It is another object of the present invention to provide a lawnmower blade holder device comprising an X-shaped frame having a first elongated support pivotally secured to a second elongated support.

Another object of the present invention is to provide a lawnmower blade holder device wherein the elongated supports include an aperture disposed in the center thereof adapted to receive a fastener therethrough.

Yet another object of the present invention is to provide a lawnmower blade holder device wherein the elongated supports each include a first and second pair of segments fastened to the ends thereof and having a recessed area therebetween in which a portion of a lawnmower blade can be positioned.

Another object of the present invention is to provide a lawnmower blade holder device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
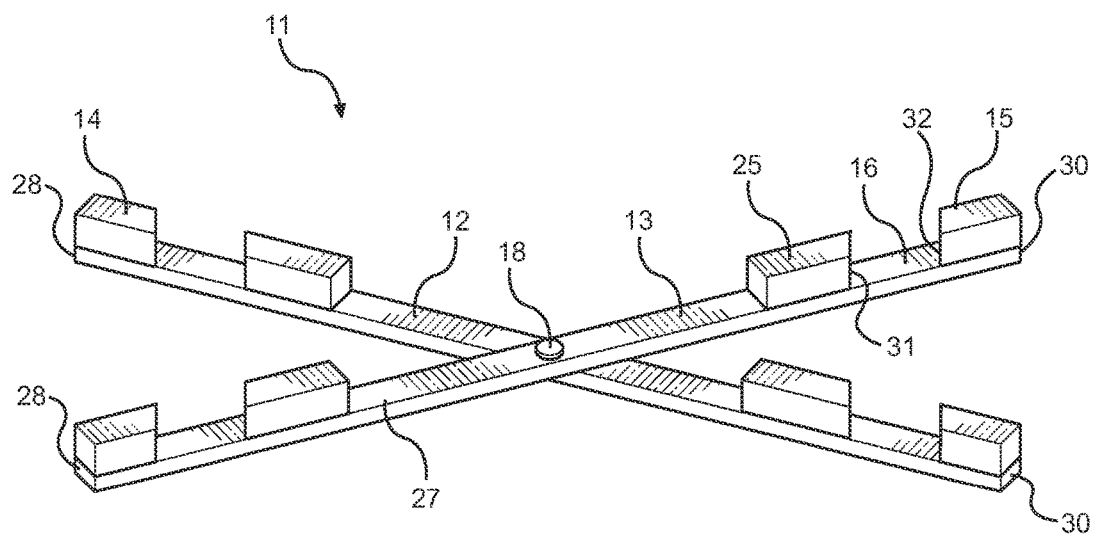
FIG. 1A shows a front perspective view of an embodiment of the lawnmower blade holder device.

Reference is made herein to the attached drawings. Like reference numerals are used throughout the drawings to depict like or similar elements of the lawnmower blade holder device. For the purposes of presenting a brief and clear description of the present invention, the preferred embodiment will be discussed as used for replacing or assembling blades on a lawnmower. The figures are intended for representative purposes only and should not be considered to be limiting in any respect.

Figure 1B:
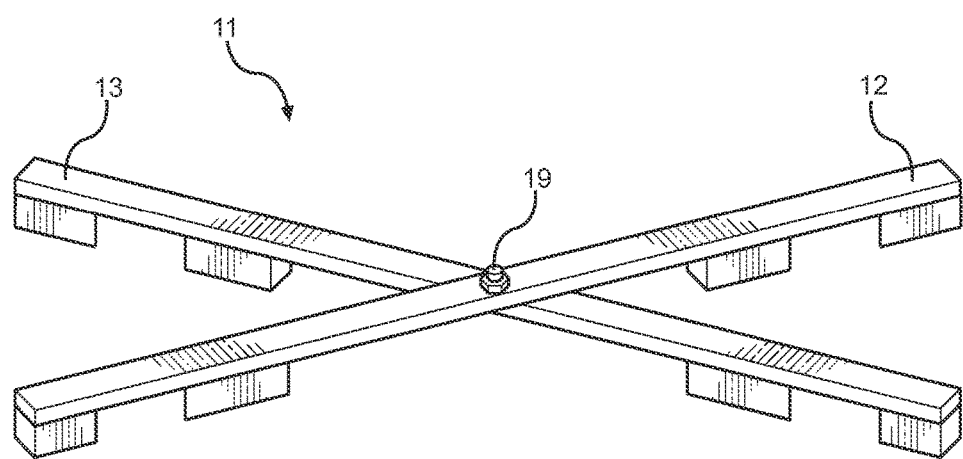
FIG. 1B shows a rear perspective view of an embodiment of the lawnmower blade holder device.

Referring now to FIGS. 1A and 1B, there is shown a front perspective view and a rear perspective view of an embodiment of the lawnmower blade holder device, respectively. The lawnmower blade holder device 11 comprises an X-shaped frame 27 formed by a first elongated support 12 pivotally secured to a second elongated support 13. The elongated supports 12, 13 each include an aperture in the center thereof adapted to receive a fastener therethrough, such as a nut 19 and bolt 18, so the first support 12 is pivotally secured to the second support 13. Each elongated support 12, 13 further includes one or more pairs of segments 14 permanently attached to the ends of each support 12, 13, wherein each pair of segments 14 is separated by a space, forming a recessed area 16 therebetween. The recessed areas 16 are adapted to receive a portion of a lawnmower blade therein. The elongated supports 12, 13 are preferably rectangular in configuration and composed of any suitable material, such as wood. The first elongated support 12 is preferably identical to the second elongated support 13.

Each elongated support 12, 13 includes a first end 28 and a second end 30, wherein the first end 28 includes a first pair of segments 14 and the second end 30 includes a second pair of segments 14. The rear surface of the pair of segments 14 is disposed flush against the upper surface of the elongated support 12, 13, wherein the segments 14 are secured thereto by any suitable fastener, such as adhesive or nails. The width of the pair of segments 14 is preferably similar to the width of the elongated supports 12, 13 so the supports 12, 13 and segments 14 are aligned if the first support 12 completely overlaps the second support 13. In this way, the device 11 is adapted for compact storage. The first pair of segments 14 is preferably identical to the second pair of segments 14.

The first segment 15 of the pair of segments 14 is disposed at the ends 28, 30 of the elongated supports 12, 13, wherein the outer face of the first segment 15 aligns with the face of the ends 28, 30 of the supports 12, 13. The second segment 25 is disposed further along on the support 12 towards the center of the support 12, thereby forming a recessed area 16 between the pair of segments 14. The recessed area 16 is adapted to receive a portion of the lawnmower blade therein. In the illustrated embodiment, the recessed area 16 is shaped as a parallelogram. The inner faces 31, 32 of the pair of segments 14 are angled in order to secure a blade therebetween at varying distances of separation under the lawnmower deck. In this way, a blade disposed on the first ends 28 of the elongated supports 12, 13 is parallel to a blade disposed on the second ends 30 of the elongated supports 12, 13. The angled inner faces 31, 32 are parallel to each other. The height of the pair of segments 14 is greater than the height of the blade adapted to fit therein so the blade can fit securely between the inner faces 31, 32 thereof. The length of the recessed area 16 is similar to the width of the portion of a blade adapted to fit therein so the blade fits securely therein. In some embodiments, the first and second pairs of segments are integral with the elongated supports.

Figure 2:
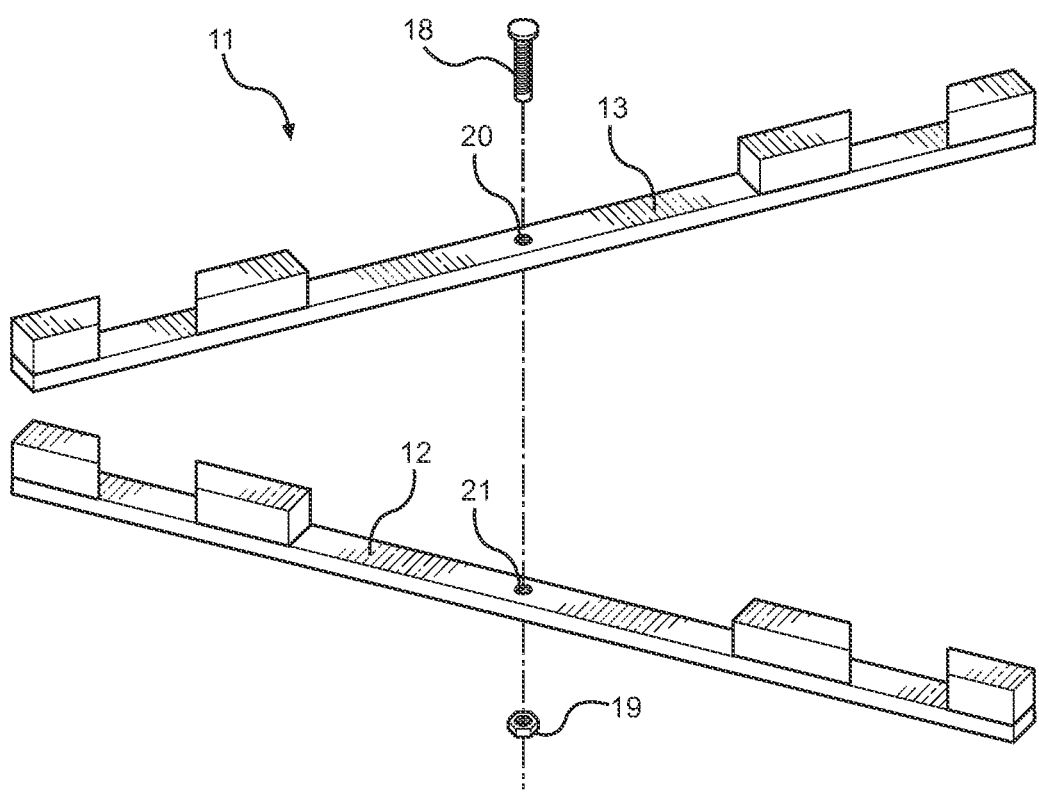
FIG. 2 shows an exploded view of an embodiment of the lawnmower blade holder device.

Referring now to FIG. 2, there is shown an exploded view of an embodiment of the lawnmower blade holder device. The device 11 further includes apertures 20, 21 disposed in the center of each elongated supports 12, 13 adapted to receive a fastener 18 therethrough. The elongated supports 12, 13 are pivotally secured by any suitable fastener, such as a nut 19 and bolt 18. The fastener is preferably adapted to be loosened or tightened in order to adjust the position of the first elongated support 12 in relation to the second elongated support 13. The first elongated support 12 is placed beneath the second elongated support 13, wherein the upper surface of both supports 12, 13 are facing upwards. The apertures 20, 21 are aligned so as to receive a fastener therethrough. In this way, the second elongated support 13 overlaps the first elongated support 12. A bolt 18 is adapted to be placed through the aperture 20 of the second support 13 and then through the aperture 21 of the first support 12, wherein the end of the bolt 18 extends through to the rear of the first support 12. A nut 19 is adapted to be loosely screwed on to the end of the bolt 18 until the X-shaped frame is formed.

Figure 3:
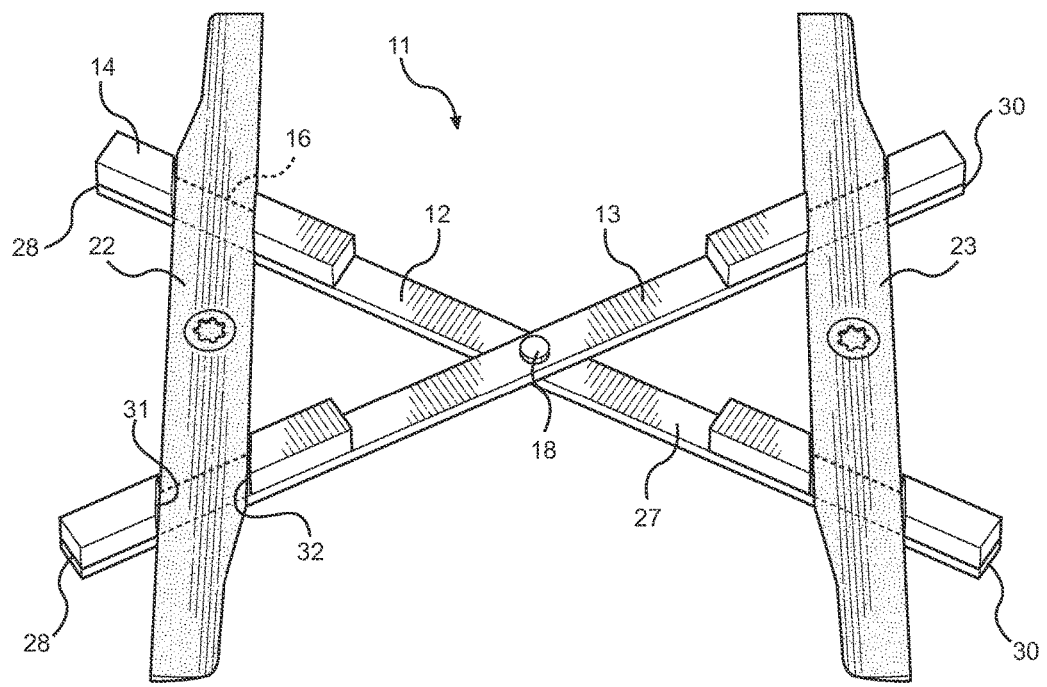
FIG. 3 shows a perspective view of an embodiment of the lawnmower blade holder device supporting blades detached from a lawnmower.

Referring now to FIG. 3, there is shown a perspective view of an embodiment of the lawnmower blade holder device supporting blades detached from a lawnmower. When the first support 12 is pivotally attached to the second support 13, an X-shaped frame 27 is formed. When the X-shaped frame 27 is formed, there is a first side of the frame 27 and a second side of the frame 27. The first side includes the first ends 28 of each support 12, 13 and the second side includes the second ends 30 of each support 12, 13. The recessed areas 16 of the first side of the frame 27 are adapted to align so as to receive a first blade therein, wherein the recessed areas 16 of the second side of the frame 27 are adapted to receive a second blade therein. The inner faces of each pair of segments are angled on the supports 12, 13 so when the supports 12, 13 form an X-shaped frame 27, the first blade is disposed on the first side of the frame 27 parallel to a second blade disposed on the second side of the frame 27, allowing for the pair of blades to be aligned when removing or assembling the blades to the lawnmower.

The elongated supports 12, 13 are adapted to be positioned so the recessed areas 16 secure a portion of the blade therein. Once the blades are positioned in the recessed area 16, the nut is tightened onto the bolt 18. A fastener is not required to secure the lawnmower blades to the recessed area 16 due to the force exerted by the angled inner faces 31, 32 of the pair of segments 14 against the edges of the blades therein. The friction between the blades and the inner edges 31, 32 of the pair of segments 14, as a result of the first elongated support 12 forming an X-shape with the second elongated support 13, allow the blade to fit securely therein.

In some embodiments, the lawnmower blade holder 11 comprises a plurality of straps 35 adapted to further secure a lawnmower blade 22 to each elongated support 12, 13. Each strap 35 comprises a first end and a second end, wherein the ends are removably secured to one another by a fastener. In the illustrated embodiment, the fastener is hook and loop material. However, in other embodiments, any suitable fastener may be used to removably secure the ends of the strap 35 to one another, such as a snap. A strap 35 is disposed on the ends of each elongated support 12, 13, wherein the ends of the strap 35 are adapted to be removably secured together to form a loop configuration around the elongated support 12 and the blade 22, thereby securing the blade 22 to the elongated support 12.

Figure 4:
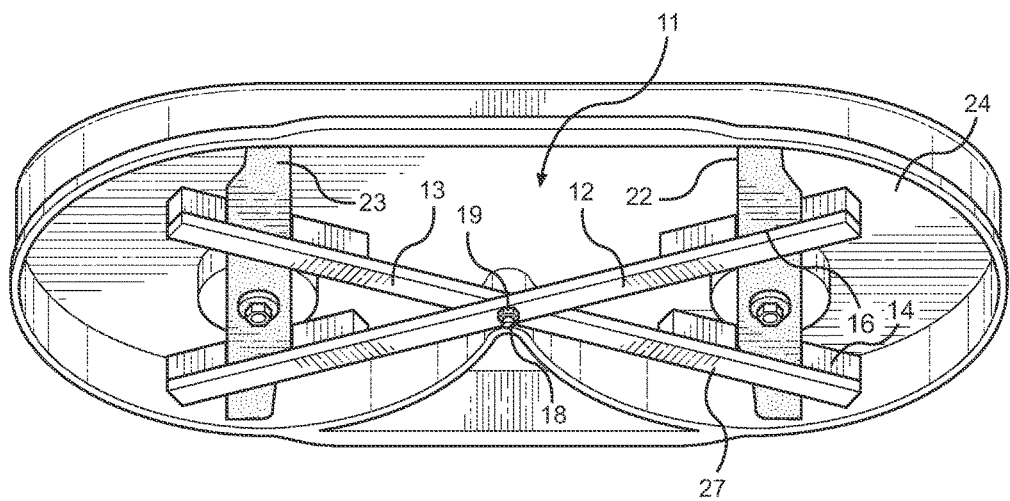
FIG. 4 shows a perspective view of an embodiment of the lawnmower blade holder device supporting blades attached to the underside of a lawnmower.

Referring now to FIG. 4, there is shown a perspective view of an embodiment of the lawnmower blade holder device supporting blades attached to the underside of a lawnmower. In operation, the recessed areas 16 are aligned with the pair of blades 22, 23, on the underside of a lawnmower 24, so that the X-shaped frame 27 can be placed thereon. The X-shaped frame 27 is positioned so that each blade is exerting force against the angled inner faces of each of the pair of segments. Once the recessed areas 16 receive the blades 22, 23 therein, the nut 19 is tightened onto the bolt 18, thereby securing the elongated supports 12, 13 together and in a position adapted to prevent the blades 22, 23 from rotating. The friction between the blade 22 and the inner faces 31, 32 of the pair of segments 14, and the recessed area 16 allow the blade 22 to fit securely therein. In this way, the blades 22, 23 are disassembled without the danger of the blades 22, 23 moving or requiring a user to directly contact the blades 22, 23 in order to remove them.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lawnmower blade holder device, comprising:
   an X-shaped frame comprising a first elongated support and a second elongated support, wherein said first elongated support overlaps said second elongated support;
   one or more pairs of segments secured to said first elongated support and one or more pairs of segments secured to said second elongated support;
   wherein a recessed area is formed between each of said one or more pairs of segments included on said first elongated support and each of said one or more pairs of segments included on said second elongated support, wherein said recessed area is adapted to hold a lawnmower blades therein;
   wherein each of said one or more pairs of segments include a first inner face and a second inner face; said first inner face on said first elongated support aligns with said first inner face on said second elongated support when said first and second elongated supports are connected to one another to form said X-shaped frame.

2. The lawnmower blade holder device of claim 1, wherein said first elongated support and said second elongated support each include an aperture adapted to receive a fastener therethrough.

3. The lawnmower blade holder device of claim 2, wherein said aperture is disposed in a center of said first elongated support and said second elongated support, wherein said aperture disposed in said first elongated support and said second elongated support are aligned and a fastener is placed therethrough adapted to allow said first elongated support to be pivotally secured to said second elongated support.

4. The lawnmower blade holder device of claim 2, wherein said fastener is a bolt and nut adapted to be loosened or tightened in order to adjust the position of said first elongated support in relation to said second elongated support.

5. The lawnmower blade holder device of claim 1, wherein said first elongated support and said second elongated support each have a first end opposite a second end, wherein a first recessed area is disposed on said first end of said first elongated support and said second recessed area is disposed on said second end of said second elongated support.

6. The lawnmower blade holder device of claim 1, wherein said one or more recessed areas are configured as a parallelogram.

* * * * *